Patented Mar. 3, 1931

1,794,510

UNITED STATES PATENT OFFICE

FRITZ E. BISCHOFF, OF SANTA BARBARA, CALIFORNIA, ASSIGNOR TO HENRY J. ULLMANN, OF SANTA BARBARA, CALIFORNIA

COLLOIDAL METALLIC PHOSPHATE AND PROCESS OF MAKING SAME

No Drawing.   Application filed August 23, 1927.   Serial No. 214,982.

This invention relates to the manufacture of colloidal suspensions, particularly suspensions of metallic salts of phosphoric acid.

An object of this invention is to disclose a method of manufacturing and preparing colloidal suspensions of metallic salts of phosphoric acid suitable for medical purposes, particularly for intravenous and subcutaneous injections. Another object is to disclose the manufacture of suspensions of colloidal metallic salts of phosphoric acid which do not damage the hemoglobin of the blood.

Another object is to produce a colloidal suspension of lead phosphate of minimum toxicity.

Colloidal suspensions of metals and metallic oxides, or ionizable metallic solutions, have been hitherto prepared rather successfully and used to some extent in the treatment of various malignant tumors and other purposes. Certain metallic colloidal suspensions when given intravenously react with the oxygen dissolved in the blood and when metallic lead colloids are used the effects and symptoms are those of classic lead poisoning. I have found a method of preparing colloidal suspensions of metallic salts, particularly metallic salts of phosphoric acid, which are subsubstantially non-toxic and do not damage the blood when given intravenously, subcutaneously, etc. In fact, I have discovered that the colloidal lead phosphate, for example, made in accordance with my process when administered to rabbits in a concentration equivalent to metallic colloidal lead or ionic lead which would be lethal, does not produce the slightest drop in the hemoglobin of the blood. The colloidal lead phosphate made by me has been used on over 30 cancer patients and the results show that it is substantially non-toxic. Patients who are in a condition of acidosis may show a slight toxic effect, but this condition is, of course, not generally found.

Although my invention may be used in the preparation of various colloidal suspensions of metallic salts of phosphoric acid, such as colloidal phosphates of lead, mercury calcium, cerium or mixtures thereof, I will describe the preparation, characteristics and use of colloidal lead phosphate in detail. The invention, however, is particularly directed to the preparation of colloidal suspensions of phosphoric acid salts of those metals which normally have a toxic physiological effect when administered intravenously or subcutaneously and which form phosphates when their ions react with blood serum or plasma.

In making this colloidal lead phosphate, I first form a solution of a suitable dispersing agent or protective colloid, such as glue, gluten, gelatine, gum arabic, gum tragacanth and the like, although I prefer to use gelatine. I have found that one part of gelatine dissolved in twenty-five parts of water gives good results. To such solution any suitable soluble metallic salt is added; in the manufacture of colloidal lead phosphates I may use lead acetate, nitrate or chloride. I prefer to use lead chloride and dissolve a suitable quantity, for example 5 grams, in the water solution of gelatine at about 200° F. To this aqueous solution of lead chloride and protective colloid I add a dilute solution of any water soluble salt of phosphoric acid, for example tri-sodium phosphate. The addition is made gradually, that is, drop by drop, and the solution kept warm and agitated throughout the period of reaction. When about ninety percent of the phosphate solution theoretically required has been added samples of the reaction product should be taken and tested with suitable indicators, for example brom-thymol blue, in order to determine the hydrogen in concentration. When neutrality is reached, the phosphate is added more slowly and when a pH of 7.4 is reached the reaction is complete. The total volume of the solution is then taken and filtered, or preferably centrifuged, so as to remove a trace of insoluble material which very often is present. Furthermore, it has been my practice to sterilize containers in which the colloidal lead phosphate is placed at about 80° C. for one hour and after such sterilization the resulting colloidal suspension keeps indefinitely. There is a tendency for such suspension to gel at low temperatures, but it remains perfectly liquid at room temperatures.

The actual proportions used in the above example were as follows: 20 grams of commercial gelatine in 500 cc. of warm water, 5 grams of lead chloride and a tri-sodium phosphate solution made by dissolving 4.6 grams of crystallized tri-sodium phosphate in 500 cc. of water. The lead content calculated from the volume of solution, and assuming that all of the lead added is in colloidal form, is about 0.4 percent. Higher concentrations of gelatine should not be used, as the resulting suspension apparently has a greater tendency to gel. The presence of the protective colloid during the formation of metallic phosphate suspensions is important, as otherwise, other reactions may occur and interfere with the results. For example, the addition of tri-sodium phosphate to a solution of lead chloride without the presence of a protective colloid, such as gelatin, results in the formation of chlor-phosphates in appreciable quantities.

My invention should not be limited to tri-lead phosphate, which apparently is formed by the use of proportions of lead chloride and tri-sodium phosphate given above, since any acid phosphate at the pH of the blood would go to form the same compound and, therefore, any organic phosphate of the type

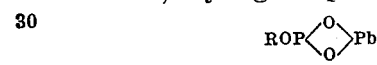

would also hydrolyze and rearrange to form this compound.

The colloidal suspensions of metallic salts of phosphoric acid described by me may be used not only for the treatment of malignant tumors but may be used wherever heavy metal therapy is advantageous.

My process of preparing these colloidal metallic suspensions is not to be strictly limited to the process described in detail, as certain variations must necessarily be made, depending upon the salt of the metal from which the phosphate colloid is to be made, and the method is influenced to a certain degree by the selection of the salts of the desired action.

I claim:

1. A colloidal suspension suitable for intravenous injection and which is substantially non-toxic and incapable of effecting the hemoglobin of the blood, comprising a colloidal metallic phosphate and a protective dispersing agent.

2. A colloidal suspension suitable for intravenous injection comprising a colloidal lead salt of phosphoric acid and a protective dispersing agent.

3. A colloidal suspension suitable for intravenous injection and which is substantially non-toxic and incapable of effecting the hemoglobin of the blood, comprising a colloidal metallic phosphate in a solution of protective colloid, the suspension being at about the pH of the blood.

4. A colloidal suspension substantially incapable of effecting hemoglobin, comprising colloidal lead phosphate in a gelatine solution.

5. A colloidal suspension substantially incapable of effecting hemoglobin, comprising colloidal lead phosphate in a sodium chloride gelatine solution.

6. A process of making colloidal suspensions comprising forming a solution of a metal salt in a liquid containing a protective colloid and then adding a salt of phosphoric acid under conditions favorable to the formation of a colloidal salt of phosphoric acid.

7. A process of making colloidal suspensions comprising forming a solution of a metal salt in a liquid containing gelatine and then adding a salt of phosphoric acid under conditions favorable to the formation of a colloidal phosphate of the metal.

8. A process of making colloidal suspensions comprising forming a solution of a lead salt in a liquid containing a protective colloid and then adding a salt of phosphoric acid so as to form a colloidal lead phosphate.

9. A process of making colloidal suspensions suitable for intravenous injections comprising dissolving a lead salt in an aqueous solution of a protective colloid, adding a sodium salt of phosphoric acid to the solution until the resulting mixture is substantially at the pH of the blood and contains substantially all of the lead in the form of colloidal lead phosphate.

10. A process of making colloidal suspensions comprising dissolving lead chloride in an aqueous solution of protective colloid and then adding a salt of phosphoric acid until substantially all of the lead is in the form of colloidal lead phosphates.

11. A process of making colloidal suspensions comprising dissolving lead chloride in an aqueous solution of gelatine, then adding a solution of tri-sodium phosphate until substantially all of the lead is in the form of colloidal lead phosphates and the resulting suspension is substantially at the pH of the blood.

12. A process of making colloidal suspensions suitable for intravenous injections comprising dissolving a salt of a metal in an aqueous solution of a protective colloid and adding a water soluble alkaline salt of phosphoric acid to the solution until the resulting mixture is substantially at the pH of the blood and contains substantially all of the metal in the form of a colloidal metallic phosphate.

Signed at Santa Barbara, Calif., this 16th day of August, 1927.

FRITZ E. BISCHOFF.